United States Patent [19]

Spaulding

[11] 3,761,829

[45] Sept. 25, 1973

[54] COHERENT DIGITAL DEMODULATOR

[75] Inventor: David Adams Spaulding, Colts Neck, N.J.

[73] Assignee: Bell Telephone Laboratories Incorporated, Murray Hill, Berkeley Heights, N.J.

[22] Filed: June 1, 1972

[21] Appl. No.: 258,609

[52] U.S. Cl. .................... 329/104, 328/115, 329/50, 329/122, 329/109

[51] Int. Cl. .............................................. H03k 9/02

[58] Field of Search ...................... 329/50, 104, 109, 329/122; 328/133, 115, 117, 151; 325/329, 330, 331, 320, 324

[56] References Cited

UNITED STATES PATENTS

| | | | |
|---|---|---|---|
| 3,611,144 | 10/1971 | Harmon et al. | 325/330 X |
| 2,778,933 | 1/1957 | Crist | 329/109 X |
| 3,502,979 | 3/1970 | Holly | 329/109 X |
| 3,638,125 | 1/1972 | Goell | 329/122 X |

*Primary Examiner*—Alfred L. Brody
*Attorney*—W. L. Keefauver et al.

[57] ABSTRACT

A digital coherent demodulator for signals pulse-amplitude modulated in the passband of data transmission systems multiplies sampled values of quadrature-related components of received data-channel signals by the respective sampled values of sines and cosines of the demodulating carrier wave and combines these two products to form a sampled baseband signal from which the transmitted data is recoverable. All samples are taken at twice the highest baseband frequency rather than at twice the highest passband frequency. The usual requirement for a low-pass filter to eliminate double-frequency components generated in the conventional demodulation process is also avoided.

7 Claims, 4 Drawing Figures

COHERENT DIGITAL DEMODULATOR

FIELD OF THE INVENTION

This invention relates to the coherent demodulation of passband amplitude-modulated digital signals.

BACKGROUND OF THE INVENTION

The well-known sampling theorem for bandlimited electric-wave functions states that such functions when confined to a bandwidth whose highest frequency is W Hz can be described completely by a series of samples taken at 1/(2W)-second intervals. The sampling time interval 1/(2W) second, which permits at least one sample of each half-cycle of the highest frequency W to be taken, is known as the Nyquist interval. In the alternative, the frequency 1/(2T) with respect to a sampling time interval of T second is called the Nyquist frequency.

Inasmuch as the sampling wave is a periodic pulse train, the product formed between the sampling wave and the information wave being sampled generates a frequency spectrum which repeats symmetrically about the fundamental and harmonics of the sampling frequency. Accordingly, it is readily seen that if the sampling frequency $f_s$ is less than twice the highest baseband frequency W, the repeated spectra overlap at their edges to result in the phenomenon known as "aliasing." Furthermore, if $f_s$ exactly equals 2W, samples can regularly occur at zero crossings of the information wave with the result that the sampling effort is wasted. It is customary, therefore, to make $f_s$ exceed 2W to avoid all-zero samples and to create a guard space between repeated spectra. A simple low-pass filter then suffices to separate the desired sampled-wave spectral components from undesired higher frequency components.

Where the information signal wave being demodulated by means of digital techniques lies in a passband, i.e., the spectral components do not extend to zero frequency, it is generally necessary nevertheless first to sample the signal as received at a frequency at least equal to twice the highest passband frequency, secondly to multiply the sampled wave by the sampled cosine of the demodulating carrier wave and finally to pass the demodulated sampled wave through a relatively complex digital low-pass filter. Sampling at any lesser rate results in the aliasing error previously mentioned.

The only previously known exception to the requirement that samples be taken at a rate at least equal to twice the highest passband frequency appears to arise when the sampling frequency can be selected equal to twice the difference between the highest and lowest passband frequencies and either the highest or lowest frequency is an integral multiple of the sampling frequency.

It is an object of this invention to demodulate passband data signals to baseband coherently with the aid of digital signal processing techniques.

It is another object of this invention to demodulate passband data signals to baseband coherently with the aid of a sampling frequency equal to twice the highest baseband frequency.

It is a further object of this invention to demodulate coherently passband data signals without employing any low-pass filters.

SUMMARY OF THE INVENTION

According to this invention, a received passband data signal wave is demodulated coherently and digitally by splitting the incoming wave into quadrature-related components, by sampling each of these components at a frequency equal to twice the highest frequency in the baseband information signal wave (and not at twice the highest frequency of the received passband wave), by multiplying the sampled split-phase components by sampled values of respective cosines and sines of a demodulating carrier wave, and by algebraically combining the sampled products of the multiplication operations to obtain a sampled representation of the baseband information signal. The overall output is the sampled digital data signal obtained directly and without the use of a low-pass filter generally required with coherent demodulators to remove redundant components associated with double the frequency of the demodulating carrier wave.

Coherent demodulation according to this invention avoids aliasing distortion regardless of the ratios between passband and sampling frequencies. Moreover, this invention is independent of the type of modulation employed, whether single sideband, vestigial sideband, double sideband or quadrature double sideband.

DESCRIPTION OF THE DRAWING

The above and other objects and advantages of this invention will be more fully appreciated from a consideration of the following detailed description and the drawing in which.

DETAILED DESCRIPTION OF THE INVENTION

Figure 1:
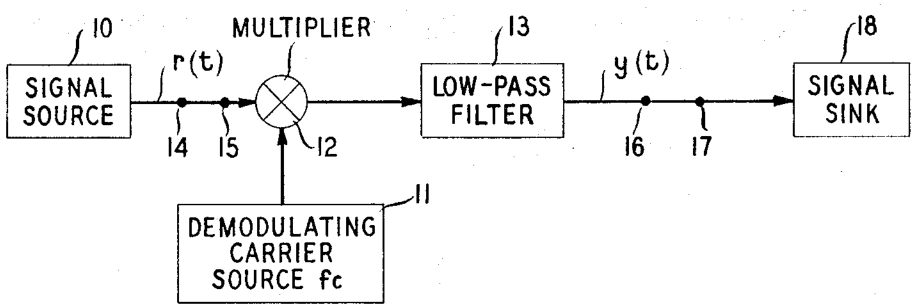
FIG. 1 (PRIOR ART)
FIG. 1 is a block schematic diagram of a coherent demodulator for analog signals known to the prior art.

FIG. 1 is a block schematic diagram of a general purpose coherent demodulator for an analog signaling wave in which an information signal is modulated onto a carrier wave. The signaling system comprises signal source 10, demodulating carrier wave source 11, multiplier 12, low-pass filter 13 and signal sink 18. Signal source 10 modulates a baseband signal, either analog or digital in nature, onto a carrier wave with frequency $f_c$. For present purposes it is immaterial what type of amplitude modulation is employed, whether single, vestigial or double sideband.

If the baseband information is represented by a wave $m(t)$, which may be analog or digital in form, the passband wave modulated onto a cosinusoidal carrier wave of radian frequency $\omega_c$ becomes at the output of signal source 10

$$\hat{r}(t) = m(t) \cos \omega_c t. \tag{1}$$

Equation (1) assumes for illustrative purposes that $m(t)$ is bandlimited at a maximum radian frequency $\omega_m$, that the transmission channel is noiseless and that it causes no phase shift or frequency offset. Accordingly, equation (1) also represents the received signal at the input of demodulator 12. Demodulation is accomplished coherently by multiplying the received wave by another cosinusoidal wave of identical radian frequency $\omega_c$ (Hertzian frequency $f_c$) derived from demodulating carrier source 11. The second multiplication becomes $$m(t) \cos^2\omega_c t = m(t)[½ + ½ \cos 2\omega_c t] = [m(t)/2 + m(t)/2] \cos 2\omega_c t. \tag{2}$$

The baseband signal $m(t)$ is thus recovered; and in addition the same information is modulated onto a double-frequency carrier wave $2\omega_c$. Low-pass filter 13 can be provided with a cutoff frequency somewhat above the highest baseband frequency to separate the baseband wave from the double-frequency component to yield $$y(t) = m(t)/2. \tag{3}$$

The recovered signal $y(t)$ is delivered to signal sink 18 for further detection operations.

The baseband signal can be recovered digitally by the prior-art coherent demodulator of FIG. 1 by placing sampling switches between terminals 14–15 at the input to multiplier 12 or between terminals 16–17 following low-pass filter 13. If the sampling switches precede multiplier 12, their frequency of operation must exceed twice the highest frequency in the passband, which is the upper bandedge frequency $\omega_c + \omega_m$, in order to avoid the aliasing effect, i.e., overlap of frequencies If the sampling switches follow low-pass filter 13, their frequency of operation need only be twice the highest baseband frequency $\omega_m$.

Since the derivation of the demodulating carrier wave has not been specified, FIG. 1 may represent any coherent demodulation system whether the received signal is double-, single-, or vestigial-sideband modulated and with or without suppression of the transmitted carrier.

The baseband information wave $m(t)$ can be generalized further on the assumption of an arbitrary phase angle $\phi$ with the carrier wave $\omega_c$. Wave $m(t)$ then possesses components respectively in phase and in quadrature with carrier wave $\omega_c$. Thus, the in-phase component becomes $$a(t) = m(t) \cos \phi \tag{4}$$

The quadrature-phase component similarly is $$b(t) = m(t) \sin \phi \tag{5}$$

It then becomes straightforward to rewrite equation (1) as $$r(t) = a(t) \cos \omega_c t = b(t) \sin \omega_c t. \tag{6}$$

Figure 2:
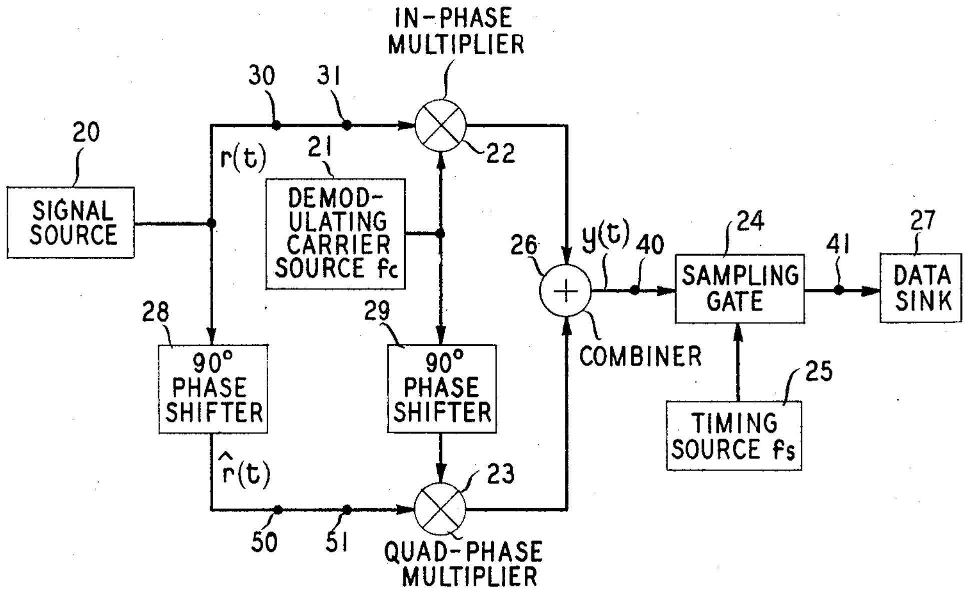
FIG. 2 is a block schematic diagram broadly illustrating the combination according to this invention of phase-shift demodulation techniques with the post-demodulation application of a sampling frequency determined by the highest baseband frequency in a received signaling wave to constitute a coherent demodulator.

FIG. 2 illustrates an alternative embodiment for demodulating a received signal in the form defined by equation (6). The demodulator of FIG. 2 comprises signal source 20, 90° received-signal phase shifter 28, in-phase multiplier 22, quadrature-phase multiplier 23, demodulating carrier source 21, 90° carrier phase shifter 29, combiner 26 and data sink 27.

In operation, in-phase multiplier 22 multiplies the direct received signal $r(t)$, as defined by equation (6), by the direct output of demodulating carrier source 21 to form the product $r(t) \cos \omega_c t = a(t) \cos^2\omega_c t + b(t) \sin \omega_c t \cos \omega_c t.$ (7)

90° phase shifter 28 operates on the received signal to form the Hilbert transform, i.e., to rotate all frequency components through minus 90°, in accordance with the following equation $$\hat{r}(t) = a(t) \sin \omega_c t - b(t) \cos \omega_c t, \tag{8}$$

where the caret or hat is the conventional symbol denoting the Hilbert transformation.

Quadrature-phase multiplier 23 then operates on the Hilbert transform $\hat{r}(t)$ of the received signal by multiplying it by $\sin \omega_c t$ (obtained from demodulating carrier source 21 after a 90° phase shift in phase shifter 29) to form the product $\hat{r}(t) \sin \omega_c t = a(t) \sin^2\omega_c t - b(t) \sin \omega_c t \cos \omega_c t.$ (9)

Signals defined by equations (7) and (9) are combined additively in combiner 26 to recover the in-phase component of the baseband signal, taking into account the trigonometric identity ($\cos^2 x + \sin^2 x = 1$), namely:

$$y(t) = a(t)[\cos^2\omega_c t + \sin^2\omega_c t] - b(t)[\sin \omega_c t \cos \omega_c t - \sin \omega_c t \cos \omega_c t] = a(t). \tag{10}$$

The complete baseband signal differs from that defined in equation (10) by the cosine of the phase angle between the baseband signal and the carrier wave in accordance with equation (4). It is apparent that the baseband signal component $b(t)$ can be obtained by using combiner 26 as a subtractor after having interchanged the respective in-phase $[r(t)]$ and quadrature $[\hat{r}(t)]$ inputs to multipliers 22 and 23. In this case the complete baseband signal can be derived from equation (5).

FIG. 2 further shows sampling gate 24 interposed between terminals 40 and 41 at the output and input respectively of combiner 26 and sink 27. Sampling gate 24 operates on the output $y(t)$ of combiner 26 at a switching rate which is twice the highest frequency of the baseband signal, even through no low-pass filter is required by the demodulator.

Since the output $y(t)$ contains no product terms involving $a(t)$ and $b(t)$, there is no problem of nonlinearity present and further more there is no memory in the demodulation process, i.e., no interference between signal components generated at different time instants. Accordingly, the function of sampling gate 24 and its timing source 25 can be transferred to the input side of the demodulator by operating on the separate direct and Hilbert-transform components of the received signal available between respective pairs of terminals 30–31 and 50–51.

Figure 3:
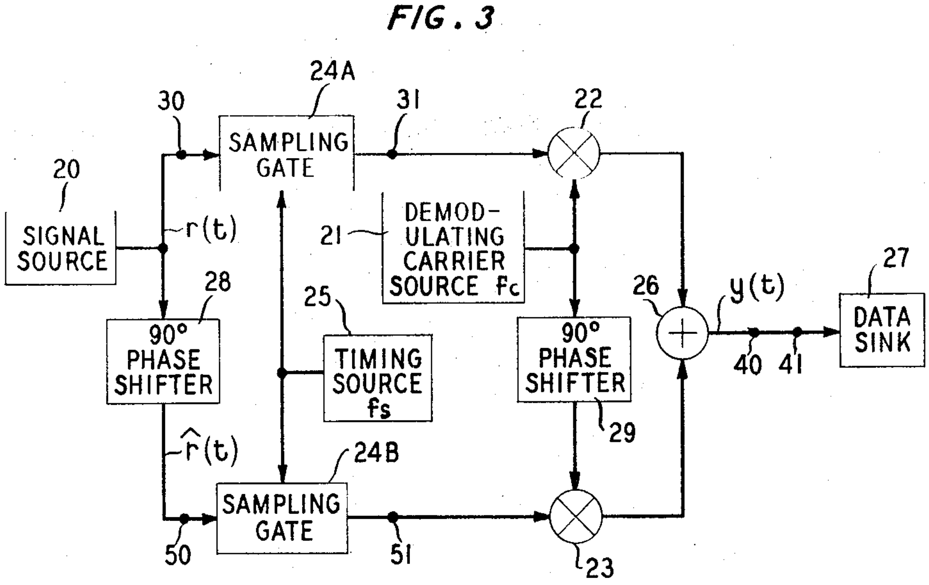
FIG. 3 is an alternative block schematic diagram illustrating, according to this invention, the employment of phase-shift demodulation techniques in combination with the predemodulation application of a sampling frequency determined by the highest baseband frequency in a received signaling wave to constitute a coherent demodulator.

FIG. 3 illustrates the transfer of the sampling function to the demodulator input and is identical to FIG. 2 except for splitting sampling gate 24 into two parts 24A and 24B controlled in common by timing source 25. All similarly designated components are identical in structure and function in FIGS. 2 and 3. The received signals $r(t)$ and $\hat{r}(t)$ are separately sampled at the baseband sampling rate and not at twice the highest frequency of the passband signal. It is sufficient that the carrier frequency $f_c$ exceed the highest baseband frequency $f_m$ by a relatively small guard space only. No particular ratio between the sampling frequency $f_s$ and any frequencies within the passband need be maintained.

Figure 4:
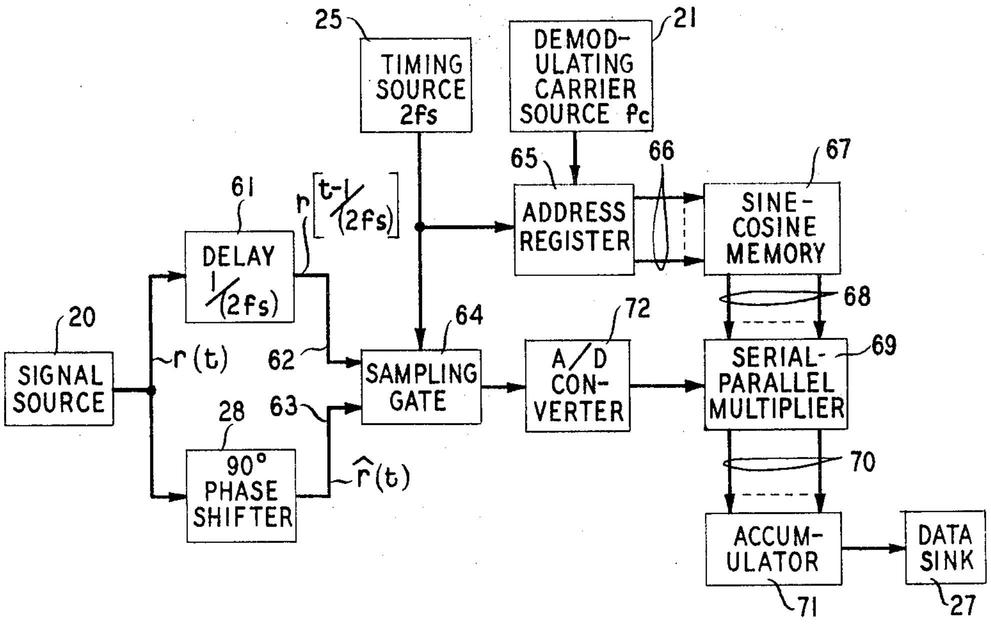
FIG. 4 is a block schematic diagram of a preferred digital implementation of a sampled coherent demodulator according to this invention.

An all-digital implementation of the sampled coherent demodulator of FIG. 3 is shown in more detail in FIG. 4. Signal source 20 represents a data transmission system, including a transmission channel not shown, as in FIGS. 2 and 3. Data sink 27 again represents the utilization circuit for demodulated baseband data. The coherent demodulator of FIG. 4 further comprises 90° phase shifter 28 for obtaining the Hilbert transform of the received signaling wave in analog form, delay unit 61 having a delay equal to the reciprocal of the sampling rate, timing source 25 having the sampling rate $2f_s$ (double the sampling rate assigned in FIGS. 2 and 3), sampling gate 64, demodulating carrier source 21, address register 65, analog-to-digital converter 72, sine-cosine memory 67, serialparallel multiplier 69 and accumulator 71.

The received signal from signal source 20 is split into two components in delay unit 61 and phase shifter 28. The component in the output of delay unit 61 is the direct component delayed by half the effective sampling period. Taking the received signal as $r(t)$, the output of delay unit 61 on lead 62 is $r]t\text{-}1/(2f_s)]$. The component in the output of phase-shifter 28 on lead 62 is the Hilbert transform of the received signal $\hat{r}(t)$. Sampling gate 64 under the control of timing source 25, operating at the rate $2f_s$, acts as a transfer switch to sample the delayed direct and Hilbert transform components on leads 62 and 63 alternately. The purpose of the alternate sampling is to time-share the remaining digital processing apparatus. The effective overall sampling rate remains $f_s$.

Analog-to-digital converter 72 transforms the received signal samples from gate 64 into multibit serial binary numbers in a conventional manner. Each number in the form of serial bit streams, representing alternately the amplitudes of the direct and Hilbert transform of the received signal, is applied to serial-parallel multiplier 69 to serve as a multiplicand. Multiplier factors are provided over leads 68 from a read-only, i.e., nonerasable, memory 67 in which are stored digital values corresponding to the sine and cosine trigonometric functions. The appropriate sine and cosine values are selected alternately under the control of address register 65 over leads 66. Address register 65 in turn is jointly controlled by timing source 25 to select alternately a stored sine and a cosine value from memory and by demodulating carrier-wave source 21.

Products obtained in series-parallel multiplier 69 are transferred over leads 70 to accumulator 71 where successive products are combined in pairs to generate binary numbers corresponding to the recovered binary data. Accumulator 71 can advantageously include a digital-to-analog converter so that its output can be decoded by data sink 27 by threshold slicing operations.

Principles of the stored program concept of digital processing and detailed operation of the memory, multiplier, accumulator and register units in FIG. 4 can be found in standard works on digital computers, such as in Chapter 5 of R. K. Richards, *Arithmetic Operations in Digital Computers*, (D. Van Nostrand Company, Inc., Princeton, N. J. 1955). The number of individual leads in respective parallel lead groups 66, 68 and 70 is determined by the number of bits per signal carried by such leads. In a practical embodiment 8 bits were found to be adequate.

While this invention has been described by way of specific illustrative embodiments, it will be understood by those skilled in the art that numerous variations may be made without departing from the spirit and scope of the following claims.

What is claimed is:

1. A coherent digital demodulator for a signal wave whose modulating baseband signal is bandlimited to a fixed maximum frequency comprising a Hilbert transformation circuit for rotating all frequency components through 90 electrical degrees, a demodulating carrier-wave source providing cosine and sine output components simultaneously, first means for multiplying said signal wave by said cosine output component, second means for multiplying the Hilbert transformation of said signal wave from said transformation circuit by said sine output component, means for combining signals from said first and second multiplying means to form an output for said demodulator, and means for sampling said signal wave at a rate not exceeding twice said maximum frequency to constitute said demodulator output signal in digital form.

2. The coherent digital demodulator defined in claim 1 in which said Hilbert transformation circuit is a wideband 90° phase shifter.

3. The coherent digital demodulator of claim 1 in which said sampling means operates on said signal wave prior to demodulation in said first and second means.

4. The coherent demodulator of claim 1 in which said sampling means operates on the output from said combining means.

5. The combination defined in claim 1 in which said multiplying means comprises a nonerasable memory storing selected sine and cosine values in digital form, an address register for providing access to the respective sine and cosine values stored in said memory, an analog-to-digital converter for transforming periodic samples of signal waves from said signal wave source into serial binary bit streams, a serial-parallel multiplier for operating on serial bit streams from said converter with selected sine and cosine values from said memory to form products, and an accumulator for combining pairs of consecutive products from said multipliers to form digital representations of said information signal.

6. In combination, a signal wave source supplying an information signal of limited frequency bandwidth modulated into a passband associated with a sinusoidal carrier wave whose frequency is at least equal to the maximum frequency in said information signal, a demodulating carrier-wave source associated with a receiver for said information signal providing cosine and sine output components simultaneously, means for multiplying said signal wave directly and after a quadrature phase shift of all frequency components by respective cosines and sines of a demodulating wave at said carrier frequency from said demodulating carrier-wave source, means for combining the products of said signal waves obtained in said multiplying means, and means in tandem with said multiplying and combining means for sampling said signal wave to form a digital output at a rate substantially equal to twice the maximum frequency in said information signal.

7. A coherent digital demodulator for a passband signal wave whose modulating baseband data signal is bandlimited to a fixed maximum frequency comprising means for delaying said passband signal by half the effective sampling interval substantially equal to the reciprocal of twice the highest frequency in said baseband data signal, means for forming the Hilbert transformation of said passband signal, an analog-to-digital converter, a timing source poviding a gating wave at twice the frequency of the effective sampling rate, means responsive to said gating wave for alternately applying the delayed passband signal from said delaying means and the Hilbert transform of said passband signal to said converter to form bit streams representing passband signal samples, a demodulating carrier wave source, a nonerasable memory for storing values of the sine and cosine trigonometric functions in digital form, an address register under the joint control of said timing and carrier-wave sources providing access to selected sine and cosine values in said memory, a serial-parallel multiplier having as one input passband signal samples from said converter and as another input selected sine and cosine values from said memory for products of said signal samples and respective sine and cosine values, and an accumulator for consecutive pairs of products from said multiplier for forming digital representations of said baseband signal wave.

* * * * *